United States Patent
Hsu et al.

(10) Patent No.: US 7,686,220 B2
(45) Date of Patent: Mar. 30, 2010

(54) MEMORY CARD DETECTION CIRCUIT AND METHOD THEREOF

(75) Inventors: Yu-Tin Hsu, Taipei (TW); Chia-Chun Lien, Taipei (TW)

(73) Assignee: Via Technologies, Inc., Taipei (TW)

( * ) Notice: Subject to any disclaimer, the term of this patent is extended or adjusted under 35 U.S.C. 154(b) by 807 days.

(21) Appl. No.: 11/558,941

(22) Filed: Nov. 13, 2006

(65) Prior Publication Data

US 2008/0016082 A1    Jan. 17, 2008

(30) Foreign Application Priority Data

Dec. 5, 2005    (TW) .............................. 94142801 A

(51) Int. Cl.
G06K 7/06    (2006.01)
(52) U.S. Cl. ................. 235/441; 235/451; 235/453
(58) Field of Classification Search ......... 235/439–441, 235/444, 451, 453
See application file for complete search history.

(56) References Cited

U.S. PATENT DOCUMENTS

| | | | | |
|---|---|---|---|---|
| 5,636,347 A * | 6/1997 | Muchnick et al. | ........... | 710/302 |
| 5,708,799 A * | 1/1998 | Gafken et al. | ........... | 710/301 |
| 5,912,618 A * | 6/1999 | Maugars | ........... | 340/520 |
| 6,164,538 A * | 12/2000 | Furuya et al. | ........... | 235/449 |
| 6,262,493 B1 | 7/2001 | Garnett | | |
| 6,271,675 B1 * | 8/2001 | Sakaki | ........... | 324/756 |
| 6,657,837 B1 | 12/2003 | Morris et al. | | |
| 7,076,589 B2 * | 7/2006 | Oh et al. | ........... | 710/300 |
| 7,503,501 B2 * | 3/2009 | Jeong | ........... | 235/487 |
| 2002/0179707 A1 * | 12/2002 | Omet | ........... | 235/451 |
| 2005/0284938 A1 * | 12/2005 | Whaley et al. | ........... | 235/441 |

FOREIGN PATENT DOCUMENTS

TW    522646    3/2003

OTHER PUBLICATIONS

TW Search Report mailed Apr. 29, 2008.

* cited by examiner

*Primary Examiner*—Ahshik Kim
(74) *Attorney, Agent, or Firm*—Thomas, Kayden, Horstemeyer & Risley

(57) ABSTRACT

The invention provides a memory card detection circuit of a computer. The memory card detection circuit comprises a plurality of query pins through which a memory card is coupled to the computer and a plurality of latch circuits respectively coupled to each of the query pins. The latch circuits generates query signals indicating whether ground bounce occurs in the voltage of the query pins due to a voltage difference between two ends of the query pins shortly after the memory card is coupled to the computer through the query pins. The query signals identify the type of the memory card without waiting until ground bounce is resolved.

21 Claims, 4 Drawing Sheets

US 7,686,220 B2

MEMORY CARD DETECTION CIRCUIT AND METHOD THEREOF

BACKGROUND OF THE INVENTION

1. Field of the Invention

The invention relates to memory cards, and more particularly to a memory card detection circuit.

2. Description of the Related Art

Conventional memory cards, such as Compact Flash from ScanDisk, Smart Media from Toshiba, Memory Stick from Sony, Multi-Media from Nokia and Motorola, and Secure Digital from Panasonic are coupled to a computer through a card adapter, which adapts the interface signals of the memory card to Personal Computer Memory Card International Association (PCMCIA) standard, whereby data is transmitted to the computer for further processing or storage.

A detection circuit of a card bus controller notifies the computer when a card is coupled thereto. After the memory card type is identified, the computer directs data transmission from the card. Voltage difference between the two ends of the pins connecting the computer and the memory card generates a ground bounce in the voltages of the connection pins. The memory card detection circuit awaits a de-bounce period after which the now steady voltages of the connection pins are measured to identify the coupling and type of the memory card. The delay in voltage detection is inconvenient and impacts performance of the card bus controller.

Further, multiple counters are required to respectively calculate specific periods to control the voltage measurement. The multiple counters require a large area, complicating the design of the memory card detection circuit and increasing the manufacture cost of the card bus controller chip.

BRIEF SUMMARY OF THE INVENTION

The invention provides a memory card detection circuit of a computer. The memory card detection circuit comprises a plurality of query pins through which a memory card is coupled to the computer and a plurality of latch circuits respectively coupled to each of the query pins. The latch circuits generate query signals indicating whether ground bounce occurs in the voltage of the query pins due to a voltage difference between two ends of the query pins shortly after the memory card is coupled to the computer through the query pins. The query signals rapidly identify the type of the memory card without waiting until ground bounce is resolved.

The invention also provides a method for detecting a memory card in a computer. In one embodiment, the memory card is coupled to the computer through a plurality of query pins of the computer. First, a plurality of latch circuits are respectively coupled to each of the query pins. Query signals of a logic high level are then generated with the latch circuits if ground bounce occurs in the voltage of the query pins due to a voltage difference between two ends of the query pins shortly after the memory card is coupled to the computer through the query pins. Otherwise, query signals of a logic low level are generated with the latch circuits if no ground bounce occurs. Finally, the type of the memory card is identified.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
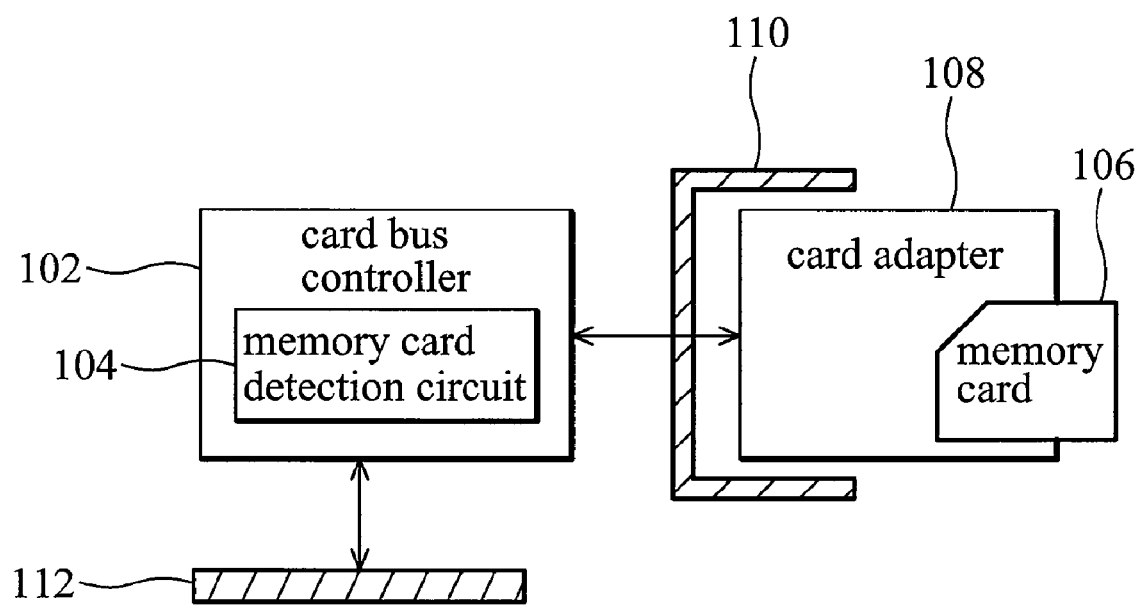
FIG. 1 is a schematic diagram showing the coupling of a memory card and a computer.

FIG. 1 is a schematic diagram showing the coupling of a memory card 106 and a computer. The memory card 106 is inserted into a card bus adapter 108, which adapts the interface signals of the memory card to the PCMCIA standard, connecting the memory card 106 to a PC card slot 110 of the computer. A card bus controller 102 couples to the memory card adapter through the PCMCIA standard interface. A memory card detection circuit 104 of the card bus controller 102 detects the existence of the memory card 106 through a card detect pin and identifies the type of the memory card 106 through a plurality of query pins. The number of the query pins is about 10, wherein two query pins define the voltage type of the memory card, four query pins define the type of the memory card, and another two query pins are undefined and reserved. For example, if voltages of the four query pins defining card type are 1000, the memory card is a Smart Media card. In addition, the query pin voltage 0100 indicates a Multi-Media card or a Secure Digital card, and the query pin voltage 1100 indicates a Memory Stick card. After the card type is identified, the data stored in the memory card is transferred to the computer through the card bus controller 102.

The voltage of the card detect pin is ordinarily at a logic high level, and the voltages of the query pins are ordinarily at a logic low level. When the memory card 106 is inserted into the card bus adapter 108 or the PC card slot 110, the memory card 106 pulls the voltage of the card detect pin down to the logic low level and raises the voltage of the query pins to the logic high level or keeps the voltage of the query pins at the logic low level according to the type of the memory card 106. When ground bounce occurs, no waiting period is required for the coupling and type of the memory card to be identified.

Figure 2:
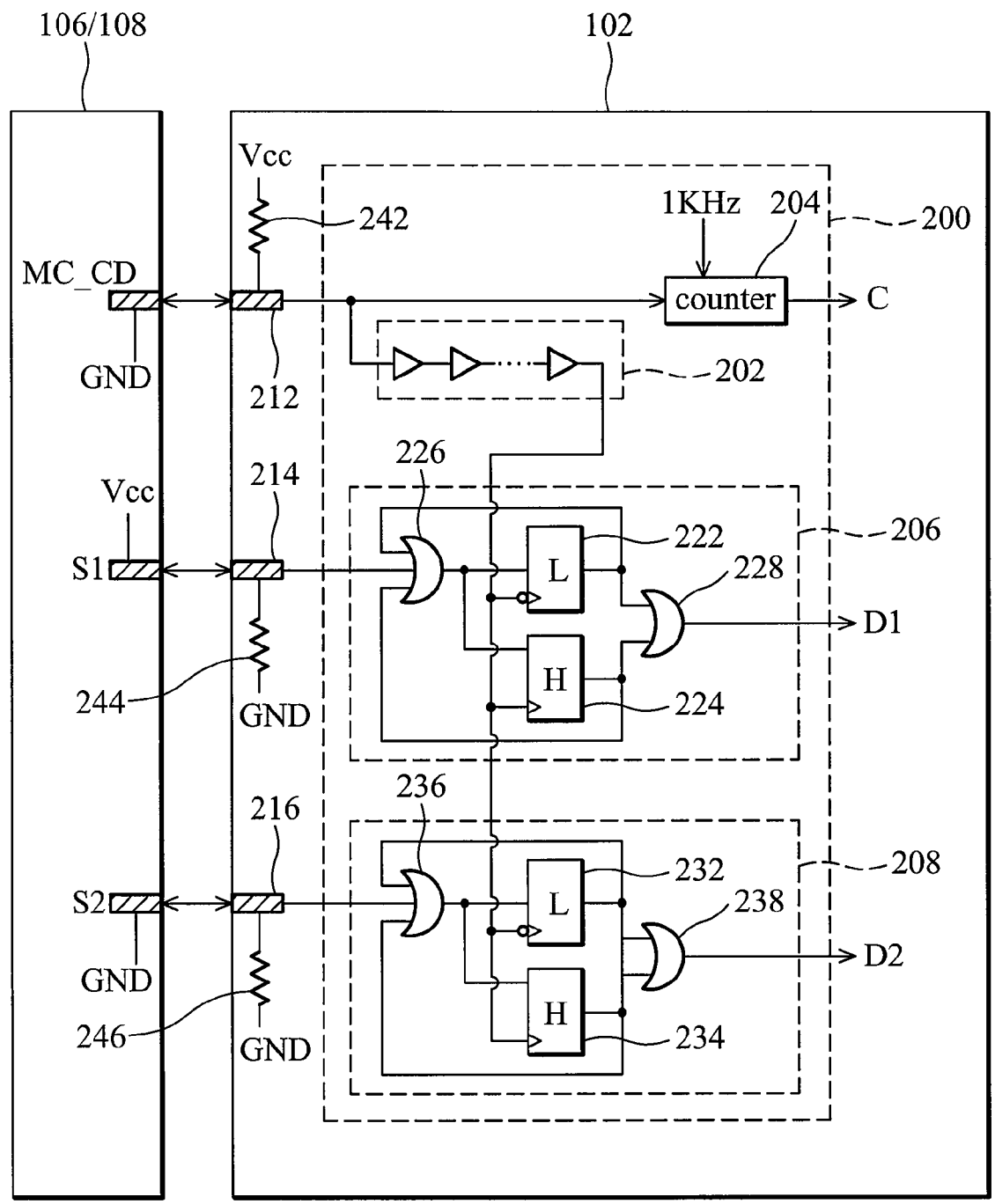
FIG. 2 is a circuit diagram of a memory card detection circuit according to the invention.

FIG. 2 is a circuit diagram of a memory card detection circuit 200 according to the invention. Memory card 106 conforms to the PCMCIA interface standard or is adapted thereto by a card adapter 108. Card bus controller 102 directs data transmission between the memory card 106 and the central processing unit of the computer. Memory card 106 includes a grounded card detect pin MC_CD and a plurality of query pins coupled to a ground GND of a logic low level or a voltage source Vcc of a logic high level according to the memory card type. Only two query pins, S1 and S2, are shown in FIG. 2, respectively coupled to the voltage source Vcc and the ground GND.

The card detect pin 212 and query pins 214 and 216 of the card bus controller 102 respectively correspond to the card detect pin MC_CD and query pins S1 and S2 of the memory card 106. When the memory card 106 is inserted to the card slot of the computer, the corresponding card detect pins 212 and MC_CD are coupled together, and the query pins S1 and S2 are respectively coupled with the query pins 214 and 216. When there is no memory card 106 in the card slot of the computer, the card detect pin 212 is coupled to a voltage source Vcc through a pull-up resister 242, and the query pins 214 and 216 are coupled to the ground GND through pull-down resistors 244 and 246. The voltages of the pins 212, 214, and 246 are therefore respectively at the logic high level, the logic low level, and the logic low level while they are not coupled with the memory card 106. Card bus controller 102 is not limited to comprising only query pins 214 and 216.

The card bus controller 102 includes a memory card detection circuit 200, which detects the coupling or removal and identifies the type of memory card 106. The memory card detection circuit 200 includes a delay line 202, a counter 204, and latch circuits 206 and 208. The delay line 202, coupled to the card detect pin 212 and comprising multiple delay cells, delays the voltage signal of the card detect pin 212 for a predetermined period. The counter 204 is coupled to the card detect pin 212 and receives a clock signal of 1 kHz frequency. When ground bounce occurs in the voltage of the card detect pin 212, the counter 204 calculates the period in which the voltage of the card detect pin 212 is at logic low level or the logic high level, and generates a card detect signal C to notify the computer of the coupling or removal of the memory card 106 if the period exceeds a threshold ranging from 2 ms to 10 ms.

The latch circuits 206 and 208 are respectively coupled to the query pins 214 and 216. The memory card detection circuit 200 may include a plurality of latch circuits according to the number of the query pins. Each of the query pins has a corresponding latch circuit acquiring and generating a logic high voltage if ground bounce occurs in the voltage of the corresponding query pin. For example, the latch circuit 206 includes a low level active latch 222, a high level active latch 224, and OR gates 226 and 228. An input terminal of the OR gate 226 is coupled to the query pin 214, and the output terminal of the OR gate 226 is coupled to both the input terminals of the low level active latch 222 and high level active latch 224. Both the trigger terminals of the low level active latch 222 and high level active latch 224 are coupled to the output terminal of the delay line 202. Thus, when ground bounce occurs in the voltage of the query pin 212, the delayed ground bounce voltage triggers the low level active latch 222 to store the voltage of the query pin 214 if the delayed ground bounce voltage is at the logic low level, and the delayed ground bounce voltage triggers the high level active latch 224 to store the voltage of the query pin 214 if the delayed ground bounce voltage is at the logic high level.

The output terminals of the low level active latch 222 and high level active latch 224 are further fed back to an input terminal of the OR gate 226. Thus, if a logic high level appearing at the query pin 214 during the ground bounce is latched by the low level active latch 222 or the high level active latch 224, the logic high level is stored in the latch circuit 206. The output terminals of the low level active latch 222 and high level active latch 224 are coupled to the input terminal of the OR gate 228 to generate a query signal D1. Thus, if ground bounce occurs in both the voltages of the card detect pin 212 and query pin 214 shortly after the memory card 106 is inserted in the PC card slot, the latch circuit 206 can acquire a logic high level voltage on the query pin 214 and outputs the logic high level voltage on the output terminal, no matter whether the delayed voltage of the card detect pin 212 is at logic high or low level when the voltage of the query pin 214 is at the logic high level.

Because both the query pins S2 and 216 are grounded, no ground bounce occurs in the voltage of the query pin 216 when ground bounce occurs in the voltage of the card detect pin 212. Thus, the latch circuit 208 acquires and outputs a query signal D2 of the logic low level. Furthermore, the delay line 202 delays the voltage of the card detect pin 212 for a predetermined period to ensure that the ground bounce at the voltage of the trigger terminals of the low level active latch 222 and high level active latch 224 lasts longer than the ground bounce at the voltage of the query pin 214. Thus, the logic high level of the ground bounce at the voltage of the query pin 214 is appropriately latched and stored by the latch circuit 206.

Figure 3:
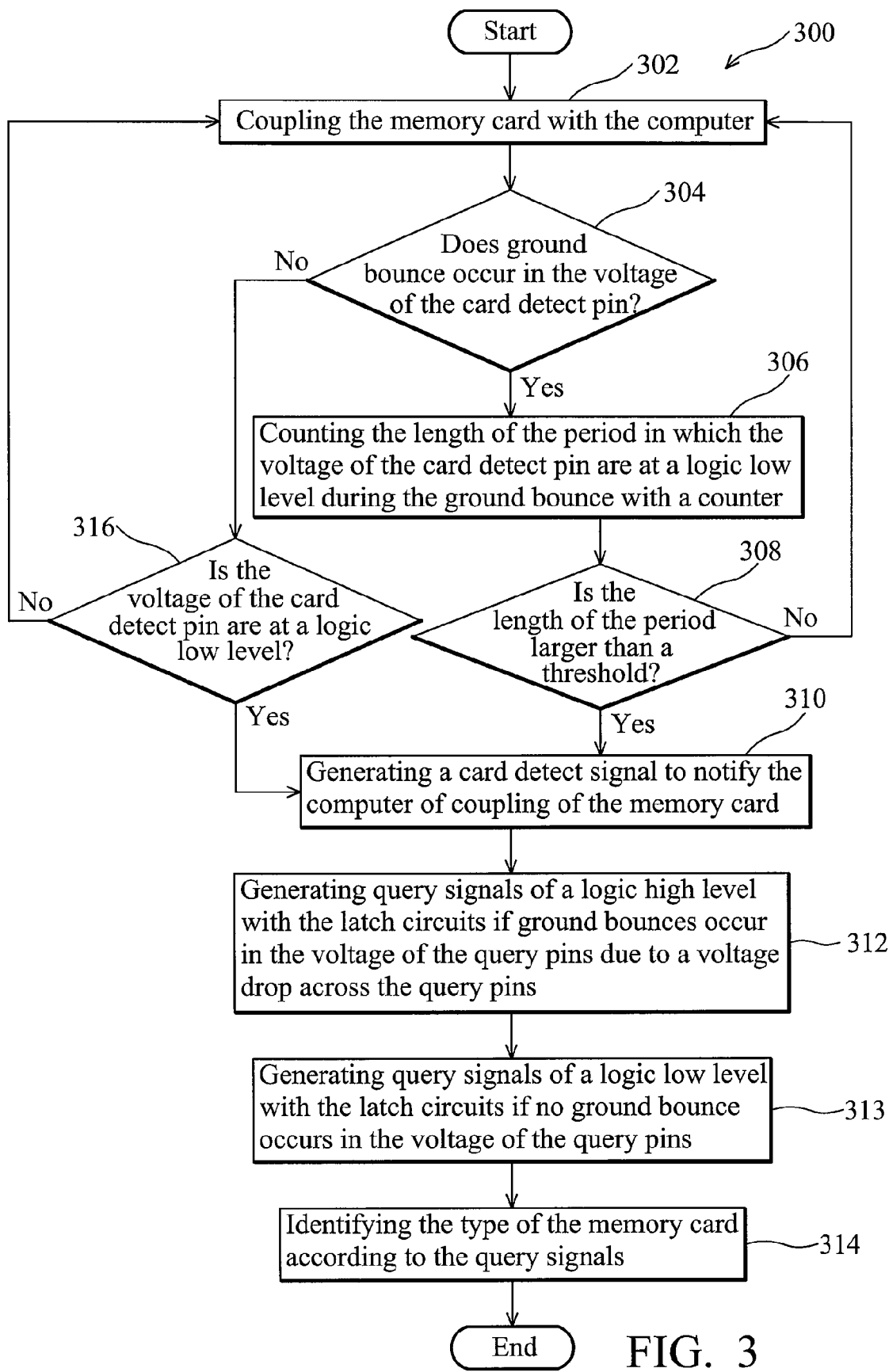
FIG. 3 is a flowchart of a method for detecting a memory card in a computer according to the invention.

FIG. 3 is a flowchart of a method 300 for detecting a memory card in a computer according to the invention, in which the presence and type of a memory card are identified within 2 ms to 10 ms during the voltage ground bounce shortly after the memory card is coupled to the computer, and no de-bounce period is required before voltage detection. First, the memory card 106 is inserted into the card adapter 108 or PC card slot 110 in step 302 to couple the memory card with the computer. If the computer is operating, the card detect pin MC_CD of the memory card 106 gradually pulls the voltage of the card detect pin 212 of the card bus controller 102 to the logic low level. Because the original voltage of the card detect pin 212 is at logic high level, ground bounce occurs in the voltage of the card detect pin 212 when the card detect pins MC_CD and 212 are coupled together in step 304. Because the cycle of the ground bounce is about 0.1 to several seconds, the time during which the voltage of the card detect pin is at the logic low level is calculated with the counter 204 in step 306.

Whether the period counted by the counter 204 exceeds a predetermined threshold is then determined in step 308. If so, the coupling of the memory card 106 and the computer is confirmed, and a card detect signal C is generated to notify the computer of the coupling of the memory card in step 310. The voltages of the query pins are then latched by the latch circuits of the memory card detection circuits. If ground bounce occurs in the voltage of the corresponding query pin, the latch circuit acquires the logic high level of the ground bounce and generates a query signal D1 of the logic high level in step 312. If no ground bounce occurs in the voltage of the corresponding query pin, however, the latch circuit acquires the logic low level of the query pin and generates a query signal D2 of the logic low level in step 313. The type of the memory card is then identified according to the query signals in step 314 without waiting until ground bounce is resolved. The time required to detect the memory card and identify the memory card type is only 2 to 10 ms for the counting process in step 306.

If the memory card 106 has been coupled to the computer, but no ground bounce occurs in step 304, the memory card 106 must be inserted into the PC card slot before the computer is started, and the card detect pin 212 is grounded. The counter 204 can still count the period in which the voltage of the card detect pin is at the logic low level in step 306. Because no ground bounce occurs, the period counted in step 306 must exceed the threshold in step 308, and the card detect signal is still generated to notify the computer of the coupling of the memory card 106 in step 310. Although no ground bounce occurs in the voltages of the query pins in the situation either, the high level active latch 224 and low level active latch 232 can still acquire and output a logic high level and a logic low level at the output terminals thereof in steps 312 and 314. Thus, the card detection and card type identification operates normally even if no ground bounce occurs.

Figure 4:
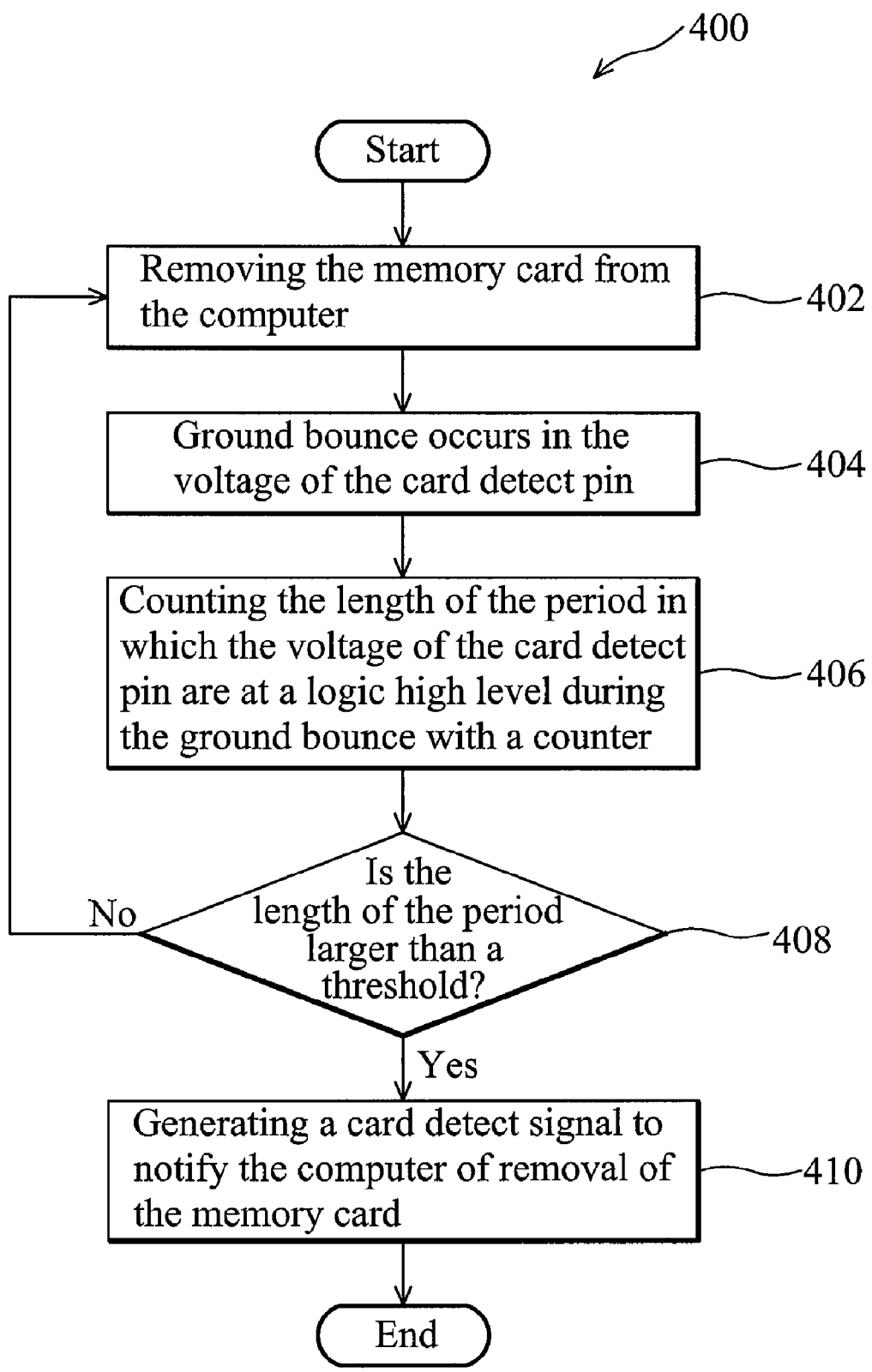
FIG. 4 is a flowchart of a method for detecting removal of a memory card according to the invention.

FIG. 4 is a flowchart of a method 400 for detecting the removal of a memory card according to the invention, in which removal of a memory card is detected within 2 ms to 10 ms during the voltage ground bounce shortly after the memory card is removed from the computer, and no debounce period is required before voltage detection. First, the memory card is removed from the card adapter 108 or PC card slot 110 in step 402. Because the card detect pin MC_CD of the memory card 106 is not coupled with the card detect pin 212 of the card bus controller 102, the pull-up resistor 242 gradually raises the voltage of the card detect pin 212 to a voltage of the logic high level. Because the original voltage of the card detect pin 212 is at logic low level, ground bounce occurs in step 404 shortly after the removal of the memory card 106. Because the cycle of the ground bounce is about 0.1 to several seconds, the length of the period in which the voltage of the card detect pin 212 is at the logic high level is calculated by counter 204 in step 406. Whether the period counted by the counter 204 exceeds a predetermined threshold is then determined in step 408. If the period exceeds the threshold, the removal of the memory card 106 from the computer is confirmed, and a card detect signal C is generated to notify the computer of the removal of the memory card in step 410, wherein the card detect signal C in the step 410 is inverse to the card detect signal C in the step 310. Thus, the computer can detect the removal of the memory card 106 according to the card detect signal without waiting until ground bounce is resolved.

The invention provides a memory card detection circuit. The memory card detection circuit can directly detect the coupling or removal of a memory card and identify the type of the memory card shortly after the coupling or removal of the memory card without waiting for ground bounce in the voltage of the query pins or a card detect pin to be resolved. As little as 2 to 10 ms are required to detect the memory card, improving performance of the memory card detection circuit. Additionally, the memory card detection circuit requires no firmware to control voltage measurement of the card detect pin and the query pins, simplifying the chip design of the card bus controller and reducing firmware load.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory card detection circuit of a computer, comprising:
   a plurality of query pins, through which a memory card is coupled to the computer; and
   a plurality of latch circuits, respectively coupled to each of the query pins, generating query signals indicating whether ground bounce occurs in the voltage of the query pins due to a voltage difference between two ends of the query pins shortly after the memory card is coupled to the computer through the query pins;
   wherein the query signals identify the type of the memory card without waiting until ground bounce is resolved.

2. The memory card detection circuit as claimed in claim 1, wherein the latch circuits output a logic high voltage as one of the query signals if ground bounce occurs in the voltage of one of the query pins, and the latch circuits output a logic low voltage as one of the query signals if no ground bounce occurs in the voltage of one of the query pins.

3. The memory card detection circuit as claimed in claim 1, wherein the memory card detection circuit further comprises:
   a card detect pin, through which the memory card is coupled to the computer; and
   a counter, coupled to the card detect pin, calculating the time during which the voltage of the card detect pin is at a logic low or logic high during a ground bounce due to coupling of the memory card and the computer or removal of the memory card from the computer, and generating a card detect signal to notify the computer of coupling or removal of the memory card if the length of the period exceeds a threshold.

4. The memory card detection circuit as claimed in claim 1, wherein the latch circuits comprise:
   a first OR gate, one input terminal of which is coupled to each of the query pins;
   a low level active latch, the input terminal of which is coupled to the output terminal of the first OR gate;
   a high level active latch, the input terminal of which is coupled to the output terminal of the first OR gate;
   a second OR gate, two input terminals of which are respectively coupled to the output terminals of the low level active latch and the high level active latch, generating one of the query signals at the output terminal thereof;
   wherein the output terminals of the low level active latch and the high level active latch are further coupled to another two input terminals of the first OR gate.

5. The memory card detection circuit as claimed in claim 4, further comprising a delay line coupled between a card detect pin and the latch circuits, wherein the memory card is coupled to the computer through the card detect pin, and when ground bounce occurs at the voltage of the card detect pin due to coupling of the memory card and the computer or removal of the memory card from the computer, the delay line comprising a plurality of delay cells delays the ground bounce of the card detect pin to generate a trigger signal.

6. The memory card detection circuit as claimed in claim 3, wherein the voltage of the card detect pin is at a logic high level when the card detect pin is not coupled with the memory card, and the memory card pulls the voltage of the card detect pin down to a logic low level when the memory card is coupled with the card detect pin.

7. The memory card detection circuit as claimed in claim 1, wherein the voltages of the query pins are at a logic low level when the query pins are not coupled with the memory card, and the memory card pulls the voltages of the query pins up to a logic high level or keeps the voltages of the query pins at the logic low level according to the type of the memory card when the memory card is coupled with the query pins.

8. The memory card detection circuit as claimed in claim 3, wherein the counter calculates the time according to a clock signal of 1 kHz frequency, and the threshold is from 2 to 10 cycles of the clock signal in length.

9. The memory card detection circuit as claimed in claim 1, wherein the query pins conform to the Personal Computer Memory Card International Association (PCMCIA) standard.

10. The memory card detection circuit as claimed in claim 3, wherein the memory card detection circuit is provided in a card bus controller coupled to the computer, the computer detects coupling or removal of the memory card according to the card detect signal, and the computer detects type of the memory card according to the query signals.

11. The memory card detection circuit as claimed in claim 1, wherein a card adapter is coupled between the memory card and the memory card detection circuit, adapting the interface signals of the memory card to Personal Computer Memory Card International Association (PCMCIA) standard.

12. A method for detecting a memory card in a computer, wherein the memory card is coupled to the computer through a plurality of query pins of the computer, the method comprising:
    respectively coupling a plurality of latch circuits to one of the query pins;
    generating query signals of a logic high level with the latch circuits if ground bounce occurs in the voltage of the query pins due to a voltage difference between two ends of the query pins shortly after the memory card is coupled to the computer through the query pins;
    generating query signals of a logic low level with the latch circuits if no ground bounce occurs in the voltage of the query pins shortly after the memory card is coupled to the computer through the query pins; and
    identifying the type of the memory card according to the query signals without waiting until ground bounce is resolved.

13. The method for detecting a memory card as claimed in claim 12, wherein the memory card is further coupled to the computer through a card detect pin, the method further comprising:
    coupling a counter to the card detect pin;
    calculating the time during which the voltage of the card detect pins is at a logic low or logic high during a ground bounce due to coupling of the memory card and the computer or removal of the memory card from the computer with the counter; and
    generating a card detect signal to notify the computer of coupling or removal of the memory card if the length of the period exceeds a threshold.

14. The method for detecting a memory card as claimed in claim 12, wherein the latch circuits comprise:
    a first OR gate, one input terminal of which is coupled to each of the query pins;
    a low level active latch, the input terminal of which is coupled to the output terminal of the first OR gate;
    a high level active latch, the input terminal of which is coupled to the output terminal of the first OR gate;
    a second OR gate, two input terminals of which are respectively coupled to the output terminals of the low level active latch and the high level active latch, generating one of the query signals at the output terminal thereof;
    wherein the output terminals of the low level active latch and the high level active latch are further coupled to another two input terminals of the first OR gate.

15. The method for detecting a memory card as claimed in claim 14, wherein the memory card is coupled to the computer through the card detect pin, and a ground bounce occurs at the voltage of the card detect pin due to coupling of the memory card and the computer or removal of the memory card from the computer, the method further comprising:
    coupling a delay line coupled between a card detect pin and the latch circuits, wherein the delay line comprises a plurality of delay cells delay;
    delaying the ground bounce of the card detect pin to generate a trigger signal; and
    delivering the trigger signal to the trigger terminals of the low level active latch and high level active latch to respectively trigger the low level active latch and high level active latch to latch data.

16. The method for detecting a memory card as claimed in claim 13, wherein the voltage of the card detect pin is at a logic high level when the card detect pin is not coupled with the memory card, and the memory card pulls the voltage of the card detect pin down to a logic low level when the memory card is coupled with the card detect pin.

17. The method for detecting a memory card as claimed in claim 12, wherein the voltages of the query pins are at a logic low level when the query pins are not coupled with the memory card, and the memory card pulls the voltages of the query pins up to a logic high level or keeps the voltages of the query pins at the logic low level according to the type of the memory card when the memory card is coupled with the query pins.

18. The method for detecting a memory card as claimed in claim 13, wherein the counter calculates the time according to a clock signal of 1 kHz frequency, and the threshold is from 2 to 10 cycles of the clock signal in length.

19. The method for detecting a memory card as claimed in claim 12, wherein the query pins conform to Personal Computer Memory Card International Association (PCMCIA) standard.

20. The method for detecting a memory card as claimed in claim 12, wherein the method is used to implement a card bus controller coupled to the computer, the computer detects coupling or removal of the memory card according to the card detect signal, and the computer detects type of the memory card according to the query signals.

21. The method for detecting a memory card as claimed in claim 12, wherein a card adapter is coupled between the memory card and the memory card detection circuit, adapting the interface signals of the memory card to Personal Computer Memory Card International Association (PCMCIA) standard.

* * * * *